US006272395B1

(12) United States Patent
Brodbeck

(10) Patent No.: US 6,272,395 B1
(45) Date of Patent: *Aug. 7, 2001

(54) SYSTEM AND METHOD FOR REPORTING VENDING STATUS

(75) Inventor: Robert Brodbeck, Littleton, CO (US)

(73) Assignee: Ident, Inc., Canfield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,554

(22) Filed: Dec. 3, 1999

Related U.S. Application Data

(63) Continuation of application No. 08/962,573, filed on Nov. 3, 1997, now Pat. No. 5,997,170, and a continuation of application No. PCT/US98/23283, filed on Nov. 3, 1998.

(51) Int. Cl.[7] .......... G06F 17/00

(52) U.S. Cl. .......... 700/236; 700/241; 700/244

(58) Field of Search .......... 700/236, 241, 700/244, 231; 221/2; 379/90.01, 399, 414; 340/310.01, 310.02, 310.03

(56) References Cited

U.S. PATENT DOCUMENTS

| | | | | |
|---|---|---|---|---|
| 4,412,292 | * | 10/1983 | Sedam et al. | 364/479 |
| 4,553,211 | * | 11/1985 | Kawasaki et al. | 364/479 |
| 4,755,792 | * | 7/1988 | Pezzolo et al. | 340/538 |
| 4,766,548 | * | 8/1988 | Cedrone et al. | 364/479 |
| 4,787,050 | * | 11/1988 | Suzuki | 364/479 |

(List continued on next page.)

OTHER PUBLICATIONS

"Goal's AccuData Link Provides Wireless Data Polling Services," Vending Times, Vol. 37, No. 2, Feb. 25, 1997–Mar. 24, 1997.

"The More Information The Better," RePlay Magazine, Feb. 1998.

"How ADL® works . . . ," AccuData Link™, 1998.

"Vending Machines," AccuData Link™, 1998.

"Goal Industries," Press Release, 1998.

*Primary Examiner*—Christopher P. Ellis
*Assistant Examiner*—Khoi H. Tran
(74) *Attorney, Agent, or Firm*—Finnegan, Henderson, Farabow, Garrett & Dunner, LLP

(57) ABSTRACT

A vending status reporting system for use with vending machines in a facility utilizing an AC power system, a telephone communication system, and a collection office. The system includes a plurality of slave units, each connectable to an associated vending machine to be monitored and to the facility's AC power system, and a master unit connectable to the facility's AC power system and to a telephone communication system. The master unit retrieves vending status information by signaling each slave unit using unique addresses in dual tone multifrequency (DTMF) code format and waiting for a response. Each slave unit includes a mechanism for retrieving information on the status of vending items of its associated vending machine and for transmitting the retrieved vending status information. A slave unit controller of the slave unit receives the transmitted vending status information and processes the transmitted information. A slave unit AC carrier interface receives the processed vending information from the slave unit controller and converts it to an AC vending status signal in DTMF format. Each master unit includes a master unit AC carrier interface for receiving the vending status signal. A master unit controller of the master unit receives and processes the received vending status signal. A master unit telephone interface is connectable to a collection office via the telephone communication system. The master unit telephone interface receives a processed vending status data signal from the master unit controller and transmits the vending status information to the collection office.

5 Claims, 3 Drawing Sheets

U.S. PATENT DOCUMENTS

| | | | | |
|---|---|---|---|---|
| 4,885,563 | * | 12/1989 | Johnson et al. | 340/310 |
| 5,051,720 | * | 9/1991 | Kittirutsunetorn | 340/310 |
| 5,311,581 | * | 5/1994 | Merriam et al. | 379/107 |
| 5,319,634 | * | 6/1994 | Bartholomew et al. | 370/18 |
| 5,337,253 | * | 8/1994 | Berkovsky et al. | 364/479 |
| 5,339,250 | * | 8/1994 | Durbin | 364/479 |
| 5,410,590 | * | 4/1995 | Blood et al. | 379/147 |
| 5,452,344 | * | 9/1995 | Larson | 379/107 |
| 5,471,190 | * | 11/1995 | Zimmermann | 340/310.01 |
| 5,530,737 | * | 6/1996 | Bartholomew et al. | 379/62 |
| 5,586,174 | * | 12/1996 | Bogner et al. | 379/106 |
| 5,769,269 | * | 6/1998 | Peters | 221/7 |
| 5,997,170 | * | 12/1999 | Brodbeck | 364/479.06 |

* cited by examiner

SYSTEM AND METHOD FOR REPORTING VENDING STATUS

This application is a continuation of Ser. No. 08/962,573 filed Nov. 3, 1997, U.S. Pat. No. 5,997,170 and a continuation of PCT/US98/23283 filed Nov. 3, 1998.

BACKGROUND OF THE INVENTION

1. Field of the Invention

The present invention relates to systems and methods for remotely reporting the status of vending machines, and more particularly, to a remote vending machine monitoring and reporting system that provides reliable communication of data in DTMF code format between a vending machine and a remote central location.

2. Description of the Related Art

There have been numerous attempts over the years to develop effective monitoring systems for vending machines. Typically, these monitoring systems are designed to ascertain various occurrences within vending machines such as inventory changes, service calls, cash receipts, product purchases, and sold out conditions. However, the broad generic functions of current vending machine monitoring systems are limited in providing effective and inexpensive communication between a vending machine and a central reporting location.

For example, U.S. Pat. No. 4,412,292 to Sedam et al. discloses a system that automatically communicates vending machine conditions to a central computer complex. Each vending machine includes a microprocessor which monitors, stores and transmits data to the central computer complex either immediately or at scheduled call-in times. The distributed logic between the vending machine microprocessors and central computer complex provides various alarm function signals, inventory control support and route planning for the supply and maintenance of the machines. In a preferred embodiment, the data is transmitted between the central computer complex and each vending machine over telephone lines. The system, however, requires either substantial rewiring or numerous dedicated telephone lines.

U.S. Pat. No. 4,766,548 to L. A. Cedrone et al. discloses a microprocessor controlled system for monitoring, storing and periodically reporting data pertinent to the commercial operation of a vending machine to a central data collection and monitoring computer. The computer periodically reports such data over a telephone line accessed on a non-dedicated basis. Although this system has some advantages over the system disclosed in U.S. Pat. No. 4,412,292, it still requires telephone connections between the vending machines and central data collection center, undesirably tying up existing telephone lines.

U.S. Pat. No. 5,339,250 to M. J. Durbin discloses an interactive hotel vending network which includes a central control at the hotel main desk and a vending unit in each hotel guest room. The microprocessor controlled vending units include a display arrangement for displaying prices of articles to be vended and a user allocatable keyboard for use in article selection and final purchase form the vending unit. Each purchase is a cooperative action between the central control and vending unit, and is completed by a vending unit acknowledgment signal required before actual billing of a rendered article occurs. Since the vending units communicate over the master television distribution (MATV) of the hotel, the Durbin network is limited to facilities employing a MATV system.

U.S. Pat. No. 5,452,344 to Larson discloses an apparatus and method for transmitting and receiving data over an electric utility line that connects two or more vending machines. The apparatus includes frequency shift keying (FSK) transmit and receive protocol and variable width databit protocol to distinguish between actual data and corrupted information (i.e., noise) traveling over the electric utility line. A location unit collects the distinguished data and forwards the data to a central site via a regular telephone line. The Larson apparatus and method requires using multiple protocols in a complex FSK format to communicate over power lines. Moreover, the amount of noise experienced on the electric utility lines may affect the integrity of collected data.

U.S. Pat. No. 3,656,145 to Proops discloses vending units that send a modulated carrier frequency signal containing vending information via an electrical conductor (i.e., AC distribution conductor) upon activation by a purchaser. The pulse signals are then relayed to a modulator unit that feeds the signals through capacitors to an AC distribution conductor. The apparatus of Proops reports the cost of each item purchased but does not provide information relating to the depletion of a specific good in a specific location of the vending unit. For example, the Proops apparatus would not report the number of potato chips bags in a bin (e.g., "B2") remaining after each purchase. In addition, as with Larson, the noise experienced on the AC distribution conductor may affect the integrity of modulated carrier frequency transmissions.

U.S. Pat. No. 5,530,737 to Bartholomew et al. discloses a system and method for transmitting voice signals over AC power lines in a telephone extension system. Specifically, Bartholomew teaches bidirectionally transmitting voice and/or dial tones between base and extension units using dual-tone multiple frequency (DTMF) coding over power lines. In essence, Bartholomew et al. teach a digital messaging system that transmits unique and matching security keys between a base unit and extension unit to offer private and secure telephone usage. The system, however, appears limited to telephone extension systems and does not suggest adaptability to a vending machine environment.

It is, therefore, desirable to provide an effective vending status reporting system that sends vending status information over one or more existing AC power lines.

It is further desirable to provide a vending status reporting system that reports a plurality of information relating to vending status to a central location.

It is also desirable to provide a vending status reporting system using a transmission protocol that does not adversely affect the integrity of data transmitted between components over AC power lines.

Additional desires, features and advantages of the invention will be set forth in the following description, and will be apparent from the description or may be learned by practicing the invention.

SUMMARY OF THE INVENTION

Systems and methods consistent with the present invention meet these desires by implementing DTMF coding over existing AC power lines in a building to economically and efficiently provide vending machine status information to a central location.

Specifically, a vending status reporting system comprises sending means, receiving means, transmitting means and notifying means. First, the sending means sends an address corresponding to a slave unit in dual-tone multifrequency (DTMF) code format over an AC power line. The receiving means receives the address at the slave unit and the transmitting means transmits vending status information in DTMF code format from the slave unit to a master unit over the AC power line. Finally, the notifying means notifies the master unit when the vending status information transmission is complete.

A method for reporting vending status comprises the steps of sending an address corresponding to a slave unit in dual-tone multifrequency (DTMF) code format over an AC power line, receiving the address at the slave unit, transmitting vending status information in DTMF code from the slave unit to a master unit over the AC power line, and notifying the master unit when the vending status information transmission is complete.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings.

DETAILED DESCRIPTION OF THE INVENTION

Reference will now be made to the construction and operation of preferred embodiments consistent with the present invention that are illustrated in the accompanying drawings. In those drawings, like elements and operations are designated with the same reference numbers.

Figure 1:
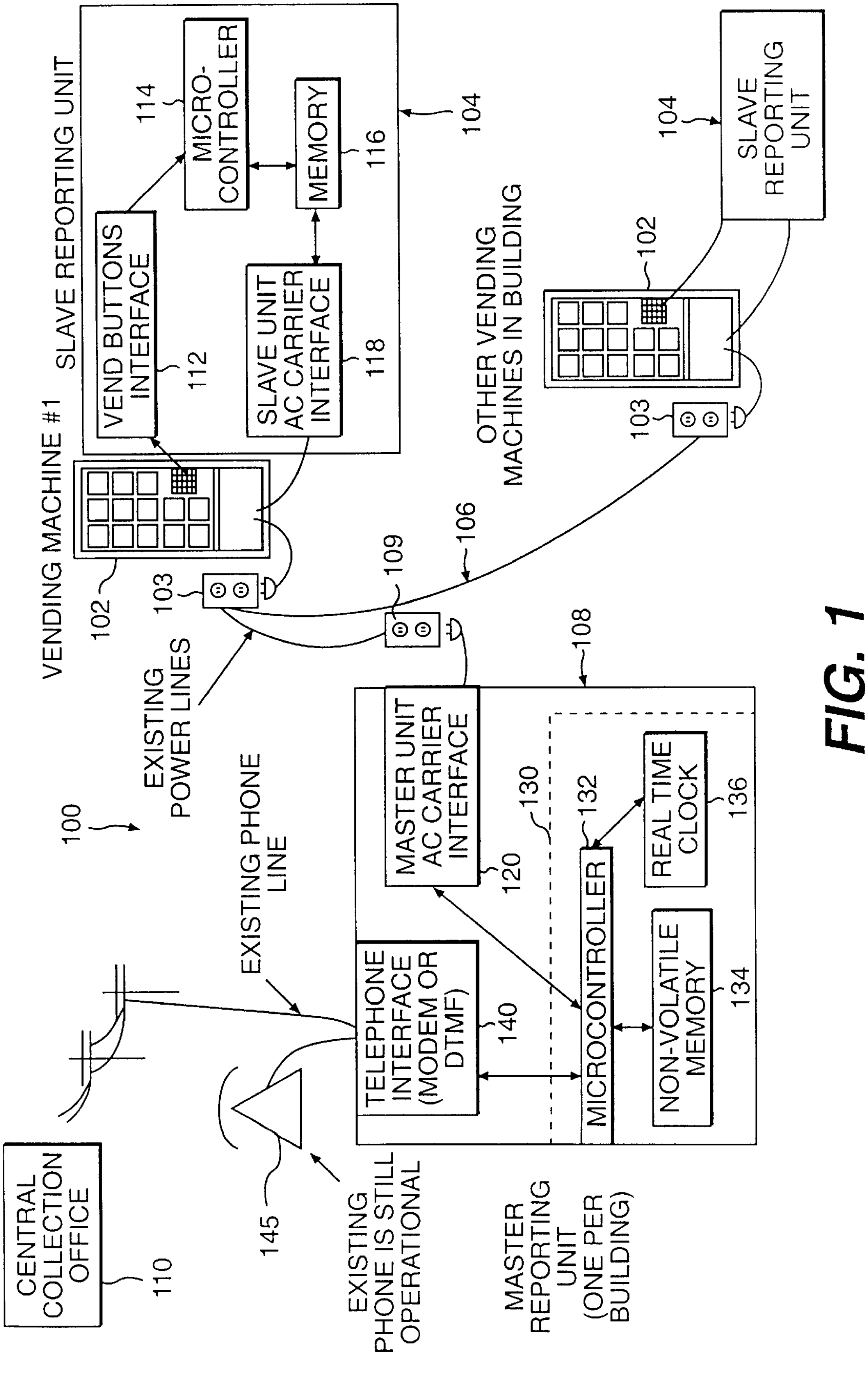
FIG. 1 illustrates a vending status reporting system consistent with the present invention.

FIG. 1 illustrates a vending status reporting system 100 consistent with the present invention. System 100 operates to accurately collect vending status information in an efficient and effective manner from one or more vending machines located in or around a building. To facilitate this operation, system 100 includes one or more vending machines 102, one or more slave reporting units 104, and existing AC power line network 106, a master reporting unit 108 and a central collection office 110.

Vending machines 102 are connected to power outlets 103 and operate to provide one or more items to a purchaser upon payment and selection. One or more items, such as potato chips, are typically stored in bins within a vending machine. To accommodate a large number of items, the bins are arranged vertically and horizontally and are sized to receive a reasonable quantity of items. Typically, items are displayed to a purchaser along with the price associated with each item. The purchaser decides on an item and inputs enough currency into the vending machine to purchase the item. The purchaser then presses one or more buttons, usually indicating the address of a bin holding the item, and the vending machine positions the item where it is retrievable by the purchaser. System 100 records information associated with each purchase such as the items purchased and selected bin address.

Each slave reporting unit 104 collects information on the status of the vending items by continuously monitoring the buttons being pushed and other machine status (e.g., out of change, dispensing motor stuck, etc.). Preferably, slave units 104 are mounted in each vending machine to collect such information. However, slave units 104 may be located on or near each vending machine. In addition, a single slave unit may be used to collect information from a plurality of vending machines.

Any changes to vending status are processed by slave units 104. To facilitate this processing operation, slave units 104 include a vend button interface 112, a microcontroller 114, a memory 116 and a slave unit carrier interface 118.

Vend button interface 112 monitors which vending selection button is pushed and converts the signals into a readable form. Preferably, interface 112 is adaptable to a variety of vending machine button configurations to add versatility to slave reporting unit 104 installation. That is, interface 112 is able to accurately retrieve vending status information from vending machines with varying button configurations. Upon converting retrieved vending status information, interface 112 sends the information to microcontroller 114.

Microcontroller 114 receives and processes vending status information signals from interface 112. Because vending status information signals may vary between vending machines, microcontroller 114 is programmed based on the type of the vending machine in which it is installed. Along with microcontroller 114 program information, vending status information received by microcontroller 114 is stored in memory 116. Configuring slave units 104 may either be accomplished by changing or updating memory 116 or by strap or switch selections. By either method, slave unit 104 is capable of collecting, processing and sending vending status information to a remote location through slave unit carrier interface 118.

Slave unit carrier interface 118 receives and converts the processed vending status information into a signal transferable over existing AC power line network 106, which connects vending machines 102, slave reporting units 104 and other components of system 100. Preferably, interface 118 includes a DTMF transceiver (e.g., a modem, not shown) that allows transmission of the vending status information in a DTMF code format. In this format, interface 118 is neither affected by power loading nor interferes with other appliances being powered over AC power line network 106. The low-level tone signals are carried throughout an area such as a building that is serviced by a single transformer. Even different power branches connected at the circuit breaker box will be able to carry the DTMF signals. In system 100, AC power line network 106 carries these signals between slave unit 104 and master reporting unit 108 to facilitate vending status reporting.

Master unit 108 is placed in a location where it can be easily connected to AC power line network 106 via power outlet 109, and includes a master unit carrier interface 120, controller 130, and telephone interface 140. These components operate collectively to retrieve and communicate vending status information from vending machines 102 and slave units 104 to central collection office 110.

Master unit carrier interface 120 communicates with each slave unit 104 in DTMF code over AC power line network 106. As such, interface 120 preferably includes a DTMF transceiver (e.g., a modem, not shown) similar to that of interface 118 in order to provide accurate transfer of vending status data. Those skilled in the art will understand that single tone multifrequency (STMF) may also be used for communication in system 100.

Because the amount of vending status data is small and data transfer rates can be moderately slow, DTMF coding is the most cost effective and reliable approach for this type of system. Currently, integrated circuits are available from several manufacturers that make this type of coding less expensive as compared to other coding schemes. This type of coding is familiar to most people as the tones generated on a push button telephone with dialing. Once transferred to the master unit carrier interface 120 in DTMF code format, the vending status reporting data is sent to controller 130 for processing.

Controller 130 includes a microcontroller 132, a non-volatile memory 134 and a real-time clock 136. These components function to process, store, and provide time and date information relating to vending status information.

Microcontroller 132 is a processor that controls the operation of master unit 108. In addition to controlling the transfer of information within system 100, microcontroller responds to requests from central collection office 110, such as when the central office requests an update on vending status information.

Microcontroller 132 communicates with memory 134 to store vending status information received from interface 120. Memory 134 collects vending status information from all vending machines served by master unit 108 for subsequent transmission to central office 110.

Microcontroller 132 communicates with real time clock 136 to provide the time and date of each vending status change. Microcontroller 132 associates this time and date information with the vending status information from each vending machine before saving the information in memory 134.

Telephone interface 140 communicates with controller 130 to send and receive data in DTMF code format from central collection office 110. Preferably, interface 140 includes a modem (not shown) and connects to an existing telephone connection shared by a telephone 145, as illustrated in FIG. 1. The telephone connection may still be used for other purposes because the master unit, preferably, will only need the telephone line for very short periods during off hours, such as after midnight. During this time, the master unit communicates with remote central collection office 110 which collects and processes vending status information from many master units over a large geographical area, such as a city. The DTMF transmission protocol facilitating the operation of master unit 110 when communicating with vending machines 102, slave units 104 and central collection office 110 is described below.

FIGS. 2*a*–2*e* illustrate data packets that are transmitted between slave unit carrier interface 118 and master unit carrier interface 120 in DTMF code. At predetermined periods, master unit 108 polls each slave unit 104 within system 100 to retrieve vending status information stored in these data packets over AC power line network 106.

Each slave unit is assigned an address number using jumper straps or switches (not shown) in the slave unit. This address must be unique for each of the slave units connected to a common master unit. Since the master and slave units communicate using DTMF code, master unit 108 transmits these addresses as a single hexadecimal character (i.e., "0–9") for small systems having less than ten slave units, and as a combination of single hexadecimal characters for larger systems. For example, if the address for a slave unit is "36," the master unit transmits the hexadecimal characters "3" and "6" in sequence.

Since DTMF code contains 16 hexadecimal characters, there are six other special characters beyond the standard characters of "0–9." These other characters are used as commands to identify the meaning of any numbers that follow. Preferably, for addresses sent from master unit 108 to slave unit 104, the character "C" (i.e., hex 0C or "12") is used as a header to indicate that the next character (or series of characters) is an address. Each slave unit 104 connected to master unit 108 over AC power line network 106 continuously monitors the AC line for its address and only responds when its address is received.

Figure 2A:
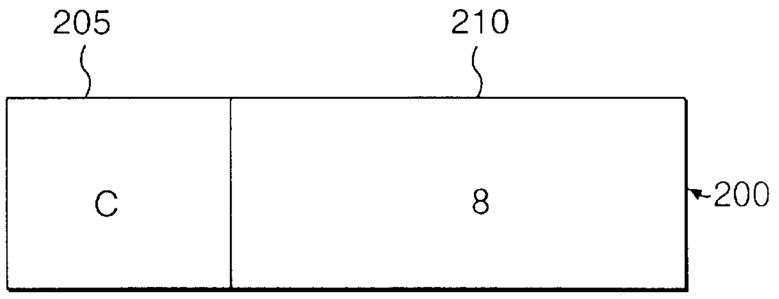
FIG. 2*a* illustrates a header and vending machine address in DTMF code.

FIG. 2*a* provides an example of a data packet 200 sent from master unit 108 representing a header 205 and address 210 which corresponds to a specific slave unit 104. In this example, character "C" is the header received at slave unit carrier interface 118. After receiving the header, interface 118 reads the address that follows to determine whether it's being polled by master unit 108. That is, each slave unit 104 monitors AC power line network 106 via interface 118 for its address. If the slave unit's address is "8," then slave unit 108 responds as provided below.

An addressed slave unit will indicate that it has been addressed and is ready to send its vending status by responding with the character "B" (i.e., hex 0B or "11"). Preferably, master unit 108 waits 100 msec after sending an address, allowing the addressed slave unit to respond before proceeding on to the next address. If a response is received within the 100 msec period, master unit 108 then waits for a transmission of vending status information.

Figure 2B:
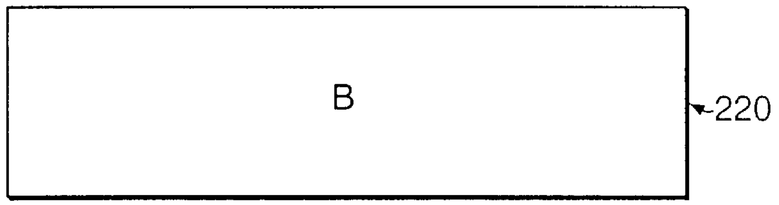
FIG. 2*b* illustrates a slave unit response signal in DTMF code.

FIG. 2*b* provides an example of a data packet 220 sent to master unit 108 indicating that a slave unit has been addressed. In this example, data packet 220 includes a character "B" which indicates to master unit 108 that the addressed slave unit is ready to transmitted vending status information. Other characters may be used to perform this function, as well as other functions of system 100 and thus, the use of characters described herein is not intended to be unduly restrictive.

The addressed slave unit sends its vending machine status back to master unit 108 by first sending a bin number (e.g., "6") followed by the number of items sold from that bin slot (e.g., 19, represented by hexadecimal characters "1" and "9"). To ensure synchronization, a character "A" (i.e., hex 0A or "10") precedes each data packet including the bin number and items sold. One or more hexadecimal characters can be used for each of the bin number and items sold. This configuration covers a vending machine with an unlimited number vending bins that can each hold an unlimited number items. Of course, due to the structural limitations of vending machines, the number of vending bins and items sold per bin is likely to be less than 99, requiring only two hexadecimal characters.

Figure 2C:
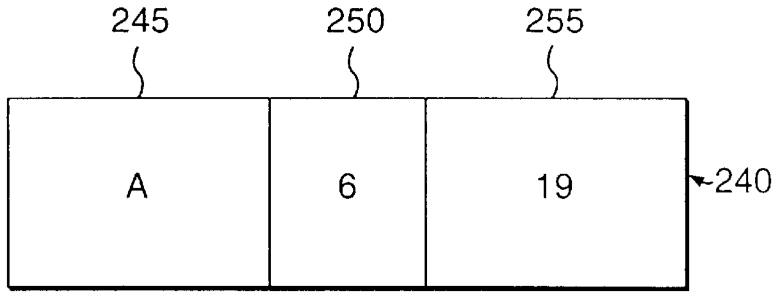
FIG. 2*c* illustrates a vending status information signal in DTMF code.

FIG. 2*c* provides an example of a data packet 240 including vending status data. In this example, data packet 240 includes a header 245, a bin number 250 and a field 255 for the number of items sold. As described above, header 245 is the character "A" and precedes the remaining portion of the data packet. Bin number 250 is represented by "6" and the number of items sold 255 is represented by a "1" and "9" in this example. Preferably, vending status information is transmitted as one data packet for all vending machine bins. Thus, in the above example, a bin number and items sold number combination for the entire vending machine follows the number of items sold 255 packet shown in FIG. 2*c*. Alternatively, vending status information corresponding to each bin may be transmitted separately to master unit 108 with a header character "A" preceding each transmission.

For systems in a high electrical noise environment or for extra security, a checksum can be included in the data packet to verify that the data received at master unit 108 is correct. The checksum is a mathematical value that represents a sum total of the vending status information for each bin. Preferably, at the end of the vending status data packet, a character "D" (i.e., hex 0D or "13") is added followed by the checksum represented by one or more hexadecimal characters (e.g., "42," represented by hexadecimal characters "4" and "2"). Once the checksum is received, master unit 108 recalculates the checksum value using the same information available to the addressed slave unit when calculating the original checksum. If the recalculated checksum equals the original checksum, the master unit accepts the vending status data. If not, the vending status data is ignored and the slave unit address is checked again in the next address sequence. Preferably, the other slave units are checked before the unit with the bad checksum is rechecked to prevent a hang-up in the system.

Figure 2D:
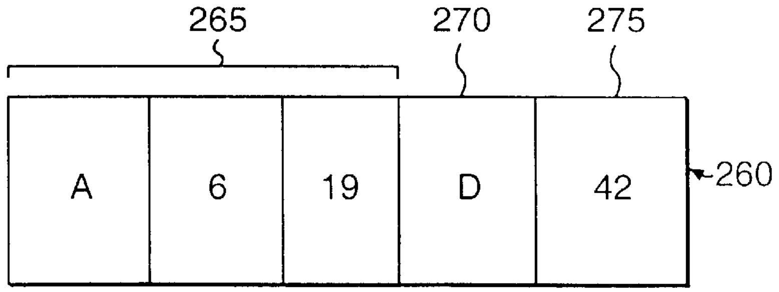
FIG. 2*d* illustrates a checksum signal in DTMF code added to the vending status information signal in an alternative embodiment consistent with the present invention.

FIG. 2*d* provides an example of a data packet 260 including vending status data and a checksum. Specifically, data packet 260 includes a vending status packet 265, checksum header 270, and checksum packet 275. Vending status packet 265 includes the header, bin number and number of items sold information from FIG. 2*c*. Checksum header 270 includes a character "D" that follows vending status packet 265 and precedes checksum packet 275 to indicate to master unit 108 that a checksum is being transmitted. Checksum packet 275 includes a checksum "42" (i.e., hexadecimal characters "4" and "2") calculated by the slave unit using a commercially known checksum algorithm. If the master unit calculates a different checksum (e.g., "41," represented by hexadecimal characters "4" and "1") upon receiving the vending status data, then the vending status data is rejected.

After sending the vending machine status information and checksum, if any, the addressed slave unit sends a character "F" (i.e., hex 0F or "15") to master unit 108 indicating that the transmission is complete. Master unit 108 records the vending status of the addressed slave unit and continues to the next slave unit address after character "F" is received.

Figure 2E:
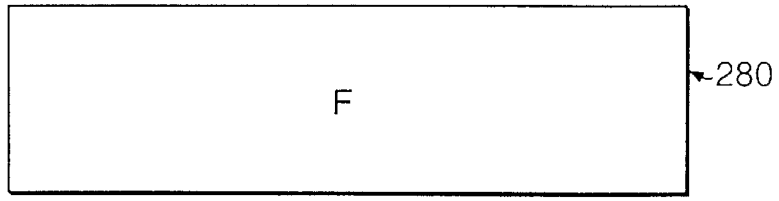
FIG. 2*e* illustrates a signal in DTMF code indicating the end of vending status information signal transmission.

FIG. 2*e* provides an example of a data packet 280 for indicating that a vending status data transmission is complete. In this example, the character "F" is shown which typically follows the vending status information and checksum, if any. Upon receiving this character, the vending status information for the addressed slave unit 104 is recorded and vending status information from other slave units is retrieved.

Periodically, such as once a day, master unit 108 is programmed to either call out or wait for an incoming call from central collection office 110. Master unit 108 calls the central office at off-hours when the outside phone line is least likely needed for other purposes. Alternatively, a separate telephone line can be dedicated for these communications, in which case, unit 108 can provide more frequent updates. Central office 110 preferably uses a computer to answer and collect data from master unit 108. Central office 110 can also dial master unit 108 for vending status information. Preferably, master unit 108 is programmed to wait for a number of rings (e.g., seven) before attempting to answer. This avoids inadvertently answering other phone calls.

Figure 3:
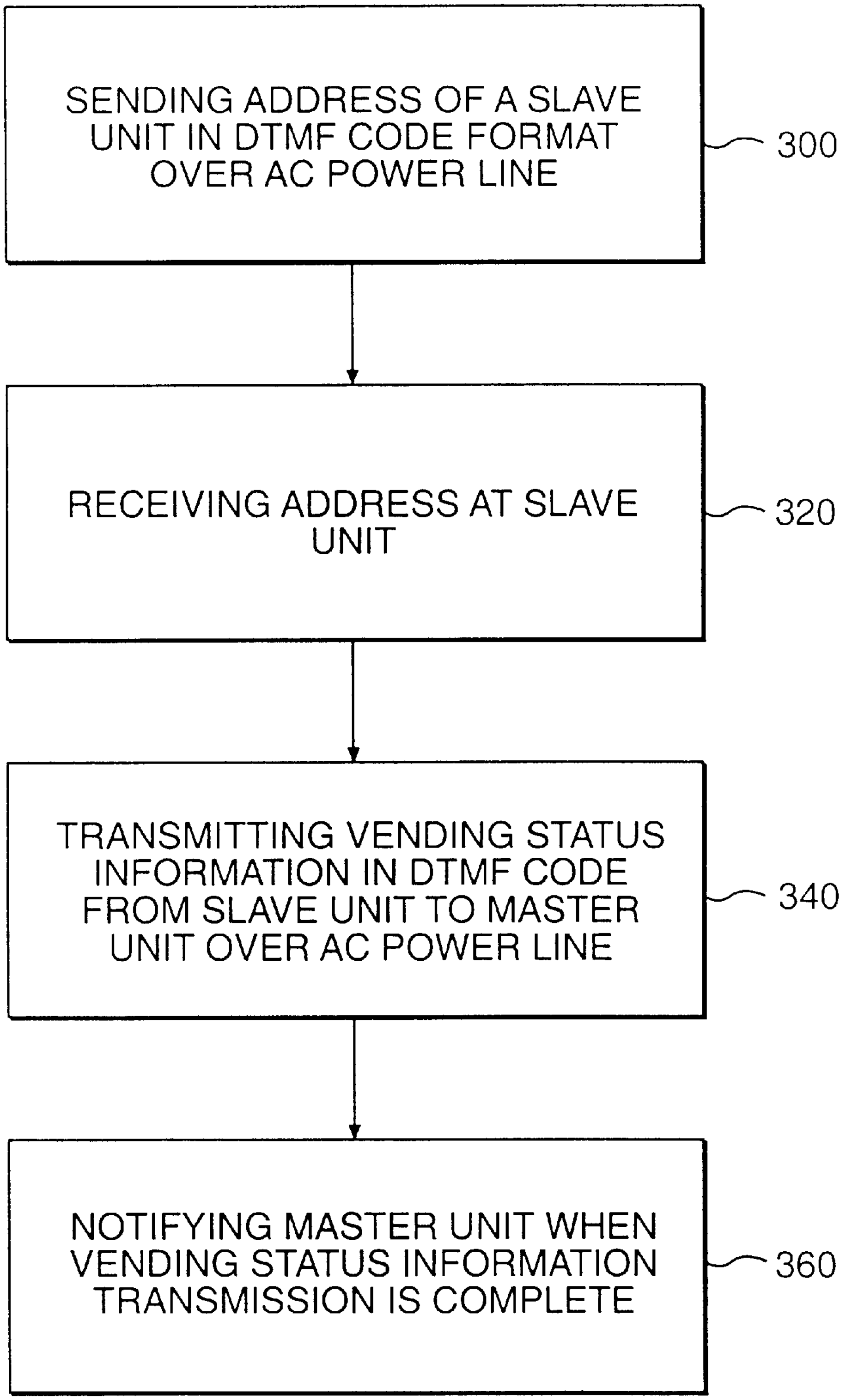
FIG. 3 illustrates a flowchart of a method of reporting vending status information consistent with the present invention.

A method of reporting vending status information is provided in the flowchart of FIG. 3. First, the master unit sends an address of a slave unit in DTMF code format over an AC power line network (step 300). A slave unit having the address, responds to the master unit indicating that the address is received (step 320). The slave unit then transmits vending status information in DTMF code to the master unit over the AC power line network (step 340). Finally, the slave unit notifies the master unit when vending status information transmission is complete (step 360).

As described herein, system 100 is a vending machine monitoring and reporting system that provides reliable communication of data in DTMF format between a vending machine, master reporting unit, and ultimately, a remote central location. System 100 relies on existing AC power lines within or around a facility to economically transmit vending status information between the above-noted components. In addition, the transmission protocol described herein virtually eliminates the adverse effects of noise on the vending status data transmission, typically experienced by conventional transmission protocols. Therefore, a user can collect accurate vending status information in a reliable and cost effective vending status reporting system.

While there has been illustrated and described what are at present considered to be preferred embodiments and methods of the present invention, those skilled in the art will understand that various changes and modifications may be made, and equivalents may be substituted for elements thereof, without departing from the true scope of the invention.

In addition, many modifications may be made to adapt to a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A vending status reporting system for reporting the status of a vending machine, comprising:

means associated with a slave unit for transmitting vending status information in binary dual tone multifrequency (DTMF) code over an AC power line to a master unit; and means associated with the master unit for receiving vending status information from said slave unit.

2. A vending system control unit, comprising:

means for transmitting information in binary dual tone multifrequency (DTMF) code format to a plurality of slave units connected thereto via an AC power line network; and means for receiving vending status information in binary DTMF code format from the slave unit.

3. A method reporting vending status, comprising the steps of:

sending an address in binary dual tone multifrequency (DTMF) code format over an AC power line, the address corresponding to a slave unit;

receiving the address at the slave unit; and transmitting vending status information in binary DTMF code from the slave unit to a master unit over the AC power line.

4. A vending status reporting system, comprising:

an AC power line network;

a vending machine connected to the AC power line network;

a slave reporting unit in communication with the vending machine, comprising:

a user interface which receives input data from a user;

a microcontroller which receives the data from the user interface; a slave AC carrier interface which sends and receives signals binary dual tone multifrequency (DTMF) code format over the AC power line network, the AC carrier interface in communication with the microcontroller; and a master reporting unit in communication with the slave reporting unit comprising:

a microcontroller; and a master AC carrier interface in communication with the microcontroller which sends and receives signals in binary dual tone multifrequency (DTMF) code format over the AC power line network to communicate with the slave reporting unit.

5. A vending reporting status system for reporting vending status information on a vending apparatus using an existing AC power network, comprising:

a communication component connectable between the vending apparatus and the AC power network and configured to communicate in binary dual tone multifrequency (DTMF) codes over the AC power network, the communication component comprising:

a processor;

a receiver, connected to the processor, configured to receive vending status information from the vending apparatus; and a transmitter, connected to the processor, configured to transmit the vending status information upon receipt by the receiver.

* * * * *

UNITED STATES PATENT AND TRADEMARK OFFICE

CERTIFICATE OF CORRECTION

PATENT NO. : 6,272,395 B1
DATED : August 7, 2001
INVENTOR(S) : Robert Brodbeck

It is certified that error appears in the above-identified patent and that said Letters Patent is hereby corrected as shown below:

Column 9,
Line 13, after "receives signals", insert -- in --.

Signed and Sealed this

Seventh Day of May, 2002

*Attest:*

JAMES E. ROGAN
*Director of the United States Patent and Trademark Office*

*Attesting Officer*